(No Model.)
W. B. BOND.
ANT TRAP.
No. 582,977. Patented May 18, 1897.
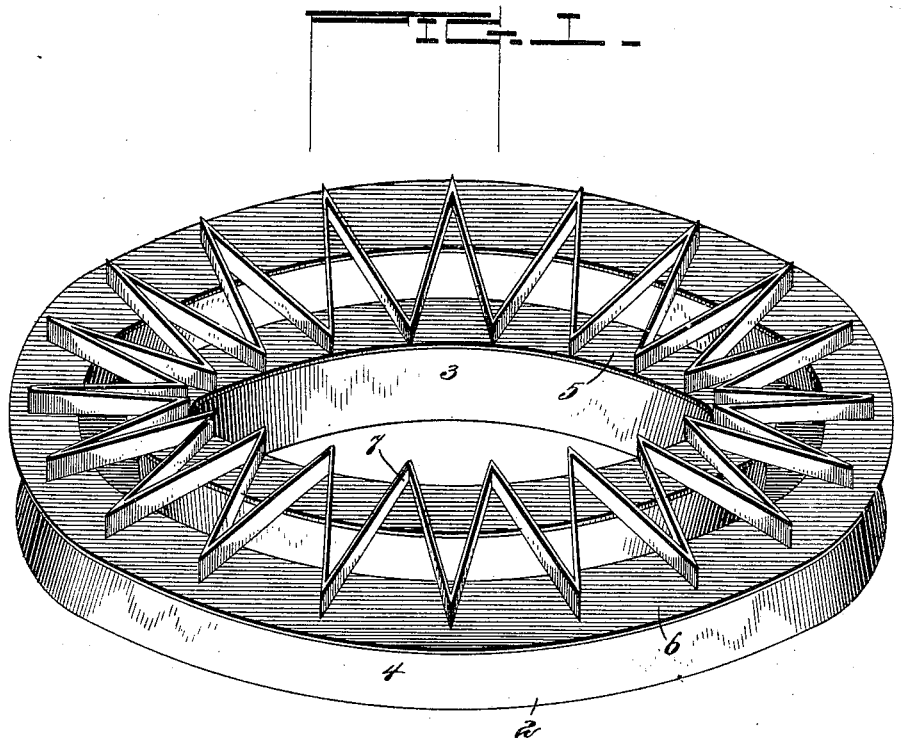
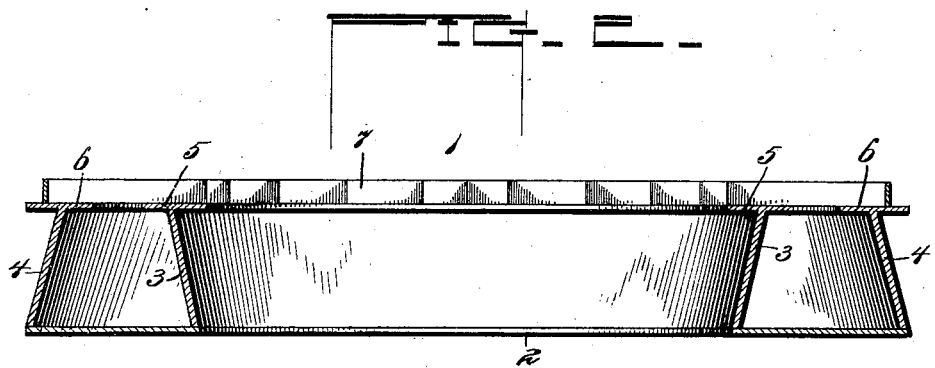
Witnesses
Milton O'Connell
T. F. Riley
Inventor
William B. Bond,
By his Attorneys,
C. A. Snow & Co.

UNITED STATES PATENT OFFICE.

WILLIAM BEEBE BOND, OF PERSONVILLE, TEXAS, ASSIGNOR OF ONE-HALF TO J. B. PARNELL, OF SAME PLACE.

ANT-TRAP.

SPECIFICATION forming part of Letters Patent No. 582,977, dated May 18, 1897.

Application filed December 16, 1896. Serial No. 615,868. (No model.)

*To all whom it may concern:*

Be it known that I, WILLIAM BEEBE BOND, a citizen of the United States, residing at Personville, in the county of Limestone and State of Texas, have invented a new and useful Ant-Trap, of which the following is a specification.

The invention relates to improvements in ant-traps.

The object of the present invention is to provide a simple, inexpensive, and convenient trap designed to be placed around an ant-hill and adapted to capture ants leaving or returning to the ant-hill.

The invention consists in the construction and novel combination and arrangement of parts hereinafter fully described, illustrated in the accompanying drawings, and pointed out in the claims hereto appended.

In the accompanying drawings, Figure 1 is a perspective view of an ant-trap constructed in accordance with this invention. Fig. 2 is a vertical sectional view of the same.

Similar numerals of reference designate corresponding parts in both figures of the drawings.

Referring to the accompanying drawings, 1 designates an annular ant-trap comprising a circular bottom 2 and inner and outer sides 3 and 4, suitably connected with the bottom and forming an annular well or chamber to receive the captured ants.

The annular ant-trap, which is designed to be arranged around an ant-hill, is provided at the upper edges of its sides with horizontal flanges 5 and 6, extending inward and outward from the sides 3 and 4. The flanges 5 and 6 are circular, and the inner flange extends in the direction of the ant-bed, and the outer flange 6 extends outward from the outer wall.

The ants are directed into the annular chamber or well by a zigzagly-arranged strip 7, disposed vertically on the flanges 5 and 6 and consisting of a series of transverse portions disposed at an angle to each other and forming a series of V-shaped pockets at the inner and outer sides of the trap. When the trap is embedded in the ground around an ant-hill, the flanges 5 and 6 are level with the surface of the ground, and the strip 7 is designed to extend upward about an inch above the ground. The ants cannot climb over the zigzagly-arranged strip and are directed by the same immediately into the well or chamber of the trap and are prevented from crawling around the top of the latter.

The walls of the annular trap are slightly inclined inward to constrict the mouth of the well or chamber and to prevent ants from crawling up the sides of the trap and to cause them to fall into the said well or chamber.

It will be seen that the ant-trap is exceedingly simple and inexpensive in construction, that it is adapted to capture ants leaving or returning to an ant-hill, and that it will prevent ants from crawling around it and direct them immediately into the chamber or well.

Having thus described my invention, what I claim is—

1. An ant-trap having a chamber or compartment, and provided at the top with a zigzagly-arranged strip extending back and forth across the top of the chamber or compartment, and forming a series of pockets at the inner and outer sides of the trap, said pockets being closed at their inner ends and intersecting the opening of the trap to direct ants into the same and prevent them from crawling around the top of the trap, substantially as described.

2. The combination with an annular ant-trap provided with a well or compartment, of a zigzagly-arranged strip located at the top of the trap and consisting of a series of transverse portions extending across the mouth of the well or compartment and forming a series of V-shaped pockets at the inner and outer sides of the trap, substantially as and for the purpose described.

In testimony that I claim the foregoing as my own I have hereto affixed my signature in the presence of two witnesses.

WILLIAM BEEBE BOND.

Witnesses:
R. P. MERRILL,
H. D. WALKER, Jr.